(12) United States Patent
Moon et al.

(10) Patent No.: US 8,593,798 B2
(45) Date of Patent: Nov. 26, 2013

(54) PORTABLE ELECTRONIC APPARATUS

(75) Inventors: Aram Moon, Gyeonggi-Do (KR);
Hyunjung Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 12/895,091

(22) Filed: Sep. 30, 2010

(65) Prior Publication Data

US 2011/0228457 A1 Sep. 22, 2011

(30) Foreign Application Priority Data

Mar. 22, 2010 (KR) ........................ 10-2010-0025472

(51) Int. Cl.
*H05K 7/16* (2006.01)

(52) U.S. Cl.
USPC .............. 361/679.22; 361/679.55; 361/679.3; 455/575.4

(58) Field of Classification Search
USPC ............ 361/679.01, 679.02, 679.55–679.58, 361/679.3, 679.4; 455/575.1–575.4; 248/917–924; 379/433.11–433.13
See application file for complete search history.

(56) References Cited

U.S. PATENT DOCUMENTS

| 6,016,248 | A * | 1/2000 | Anzai et al. ............... 361/679.59 |
| 7,497,410 | B2 * | 3/2009 | Lee ............................... 248/398 |
| 7,566,043 | B2 * | 7/2009 | Chen ............................. 248/616 |
| 8,014,147 | B2 * | 9/2011 | Chen et al. ............... 361/679.56 |
| 2008/0251663 | A1 | 10/2008 | Tracy et al. | |

FOREIGN PATENT DOCUMENTS

| CN | 1175019 A | 3/1998 |
| CN | 1991091 A | 7/2007 |
| CN | 101414200 A | 4/2009 |
| KR | 10-2002-0039201 | 5/2002 |
| KR | 10-2009-0080426 | 7/2009 |

OTHER PUBLICATIONS

Office Action from corresponding KR 10-2010-0025472 (KR priority application).
Notification of First Office Action dated Jul. 1, 2013 from the State Intellectual Property Office of the People's Republic of China in counterpart Chinese application No. 201010289938.1.

* cited by examiner

*Primary Examiner* — Hoa C Nguyen
*Assistant Examiner* — Ingrid Wright
(74) *Attorney, Agent, or Firm* — Morgan, Lewis & Bockius LLP

(57) ABSTRACT

A portable electronic apparatus including a main body having a front portion and a rear portion, a display unit disposed on the front portion, and a support module disposed on the rear portion, the support module operable to support the main body at an incline relative to a surface, the support module including a support unit, a free end of the support unit being disposed on the rear portion in a first configuration and the free end of the support unit being disposed apart from the rear portion in a second configuration, a guide unit, the guide unit being disposed between the main body and the support unit to guide the rotation of the support unit, and an elastic unit, the elastic unit being connected to the support unit and the rear portion so as to apply an elastic force to the support unit in the direction of rotation of the support unit.

19 Claims, 7 Drawing Sheets

PORTABLE ELECTRONIC APPARATUS

This application claims the benefit of the Korean Patent Application No. 10-2010-0025472 filed on Mar. 22, 2010, which is hereby incorporated by reference.

BACKGROUND OF THE INVENTION

1. Field of the Invention

The present invention relates to portable electronic apparatus, and more particularly to, a portable electronic apparatus that can be placed to make a specific angle with a surface.

2. Discussion of the Related Art

A portable electronic apparatus is an electronic device that is portable and may include voice and video communication functions, an information input, an output function, a data storage function, and the like. As the functions become diversified, the terminal is implemented in the form of a multimedia player having complicated functions such as capturing still or moving images, playing music or video files, receiving broadcast signals, and the like.

In order to implement such complicated functions of a multimedia player, various changes have been made to the hardware and software of the portable electronic device. As an example, a user interface environment is provided to allow the user to easily and conveniently retrieve or select the functions of the multimedia player. However, when considering the portability of an portable electronic apparatus, it may be accompanied by the limitation of making it difficult to place the portable electronic apparatus on a table or the like. Accordingly, a device for more easily placing the portable electronic apparatus on a surface may be considered.

SUMMARY OF THE INVENTION

Accordingly, the present invention is directed to a portable electronic apparatus that substantially obviates one or more problems due to limitations and disadvantages of the related art.

An object of the present invention is to provide a portable electronic apparatus that can be more easily placed on a surface and within a specific angle range.

Another object of the present invention is to provide a portable electronic apparatus in which the state of a support module is automatically changed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the portable electronic apparatus includes a portable electronic apparatus including a main body having a front portion and a rear portion, a display unit disposed on the front portion, and a support module disposed on the rear portion, the support module operable to support the main body at an incline relative to a surface, the support module including a support unit, a free end of the support unit being disposed on the rear portion in a first configuration and the free end of the support unit being disposed apart from the rear portion in a second configuration, a guide unit, the guide unit being disposed between the main body and the support unit to guide the rotation of the support unit, and an elastic unit, the elastic unit being connected to the support unit and the rear portion so as to apply an elastic force to the support unit in the direction of rotation of the support unit.

In another aspect, the portable electronic apparatus includes an expansion module for a portable electronic apparatus, the module including an expansion body connected to a rear portion of the portable electronic apparatus, the expansion body operable to exchange data or power with the portable electronic apparatus, and a support module disposed on the rear surface of the expansion body, the support module operable to support the expansion body and the portable electronic apparatus at an incline relative to a surface, the support module including a support unit, a free end of the support unit being disposed on the rear portion in a first configuration and the free end of the support unit being disposed apart from the rear portion in a second configuration, a guide unit, the guide unit being disposed between the main body and the support unit to guide the rotation of the support unit, and an elastic unit, the elastic unit being connected to the support unit and the rear portion so as to apply an elastic force to the support unit in the direction of rotation of the support unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

Figure 1:
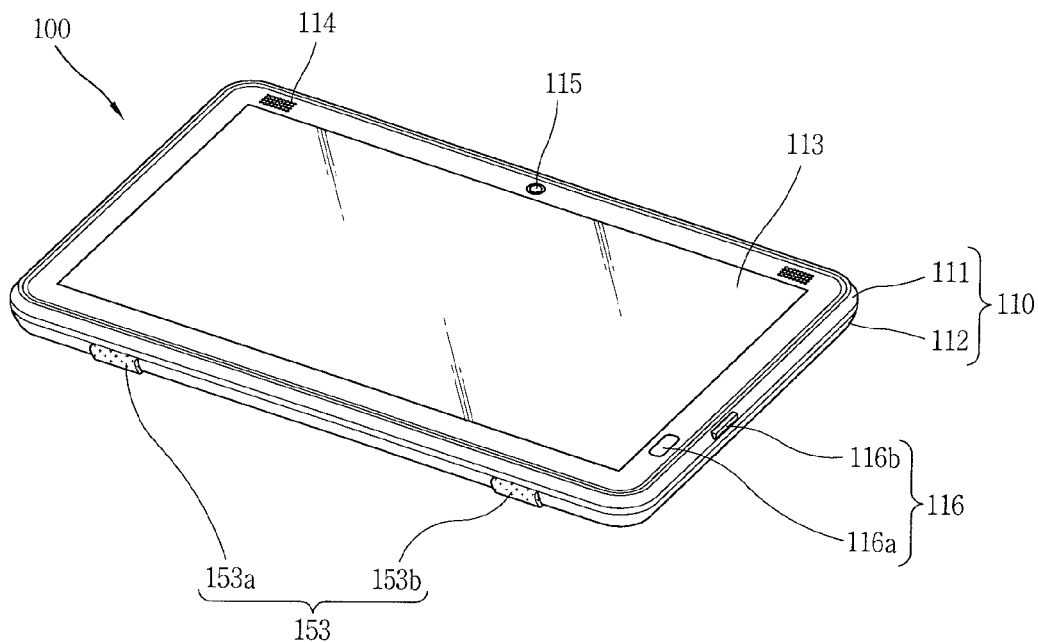
FIG. 1 is a perspective view of an exemplary portable electronic apparatus according to an exemplary embodiment of the present invention.

FIG. 1 is a perspective view illustrating a portable electronic apparatus 100 according to an exemplary embodiment of the present invention. FIG. 1 illustrates a tablet PC as an example of the portable electronic apparatus. However, a portable electronic apparatus may also include a laptop computer, smart phone, digital broadcasting terminal, personal digital assistant (PDA), portable multimedia player (PMP), navigator, or the like.

The portable electronic apparatus 100 includes a body (or main body) 110. However, the present invention will not be limited to this, but may also be applicable to various structures, such as mobile devices having at least two bodies coupled to each other, for example, a flip phone or laptop. The body may include a case (housing, casing, cover, etc.) forming the outside of the portable electronic apparatus 100. The case may be divided into a front case 111 and a rear case 112. In addition, various electronic components may be incorporated into a space between the front case 111 and the rear case 112. At least one intermediate case may be additionally disposed between the front case 111 and the rear case 112. In addition, the cases may be formed of a resin by injection molding, or formed of metallic materials such as stainless steel (STS) and titanium (Ti).

A display unit 113, an audio output module 114, a camera 115, a user input unit 116 and the like may be disposed on the electronic apparatus body, particularly, on the front case 111. The display unit 113 may occupy most of a principal surface of the front case 111. The principal surface of the front case 111 may be referred to as a front surface of the electronic apparatus body. The display unit 113 is provided to display visible information or image information, and the display unit 113 may include at least one of a liquid crystal display (LCD), a thin film transistor LCD (TFT-LCD), an organic light emitting diode (OLED) display, a flexible display, or a three-dimensional (3D) display. The display unit 113 may include a touchpad for allowing a user's touch input. In this case, the display unit 113 may operate as a touch screen.

The display unit 113 may output various types of visible information. Such information may be outputted in various forms, such as letters, numbers, symbols, graphics, icons or the like. For input of such information, at least one of the letters, numbers, symbols, graphics or icons may be displayed in a present arrangement, thereby implementing a type of keypad, which may be called as 'soft key.'

The display unit may operate as an overall region, or by being divided into plural regions. In the latter case, the plurality of regions may be configured to cooperatively operate together.

The user input unit 116 may be manipulated to receive commands for controlling operations of the mobile device 100, and include a plurality of manipulation units 116a and 116b. The manipulation units 116a and 116b may also be commonly referred to as a manipulating portion, which can be manipulated in any tactile manner that the user can make a touch input. For instance, the manipulation units 116a and 116b can be implemented as a keypad, dome switch, touchpad (e.g., static pressure/capacitance), jog wheel, jog switch or the like.

The information input via the plurality of manipulation units 116a and 116b may be configured in various manners. For instance, the first manipulation unit 116a may be used to receive a command such as START, END, etc., and the second manipulation unit 116b may be used to receive a command such as SCROLL or the like, or a command such as volume adjustment of sound output from the audio output module 114.

The audio output module 114 and the camera 115 may be located at a region adjacent to a side of the display unit 113. The audio output module 114 may include a speaker, a receiver, and the like. Also, the camera 115 may be provided in the electronic apparatus body in a rotatable or pop-up manner.

A controller for controlling the display unit 113 and the user input unit 116 may be disposed in the body. The controller may be implemented as a printed circuit board.

Figure 2:
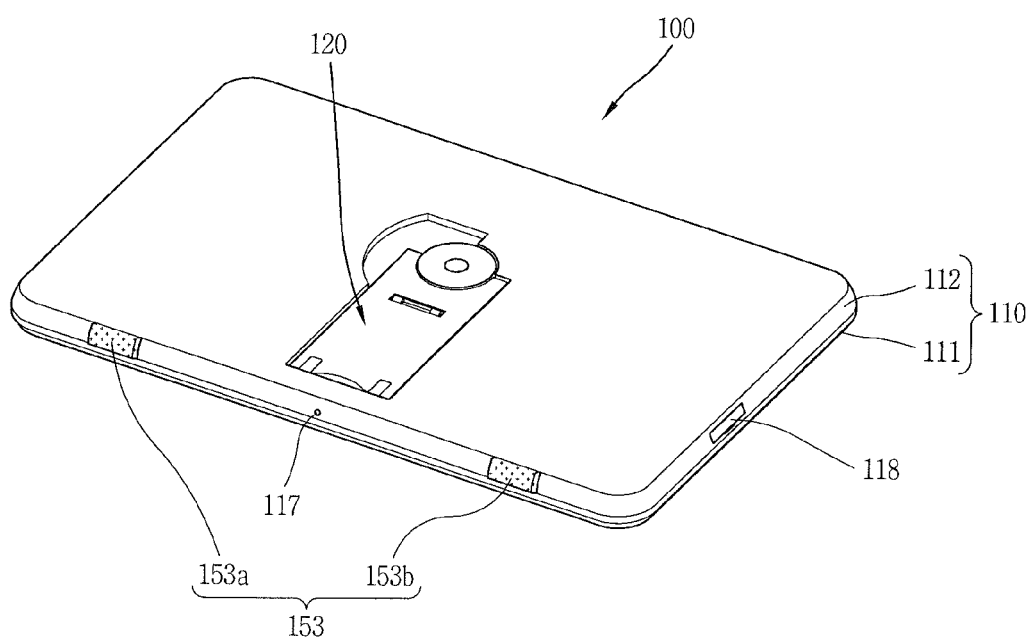
FIG. 2 is a rear perspective view of the exemplary portable electronic apparatus illustrated in FIG. 1.

FIG. 2 is a rear perspective view of the exemplary portable electronic apparatus 100 of FIG. 1.

An audio output module may further be disposed at a rear surface of the portable electronic apparatus body. The audio output module may cooperate with the audio output module 114 (refer to FIG. 1) to implement a stereo function. Also, the audio output module may be used to implement a speakerphone mode.

A wireless communication or broadcast signal reception antenna may be disposed at a side surface of the mobile device body. Also, the antenna may be provided in a retractable manner in the portable electronic apparatus body.

Referring to the drawings, the portable electronic apparatus body may include a microphone 117, a connection port 118, and the like. The microphone 117 may be disposed far from the audio output module 114. For example, the microphone 117 may be disposed at an opposite side of the audio output module 114 relative to the display unit.

The circuit board 118 and the like may be located at lateral surfaces of the front case 111 and the rear case 112. The circuit board 118 may include at least one of a connection terminal for wired or wireless connection to an earphone, a port for short-range communication (e.g., infrared (IrDA) port, Bluetooth port, wireless LAN port, etc.), or a power supply terminal for supplying power to the portable electronic apparatus. The circuit board 118 may also include a card socket for accommodating an external card such as subscriber identification module (SIM), user identity module (UIM), memory card for storing information, or the like.

A power supply unit for supplying power to the mobile device 100 may be mounted on the mobile device body. The power supply unit may be a built-in battery to be mounted inside the body.

Figure 3:
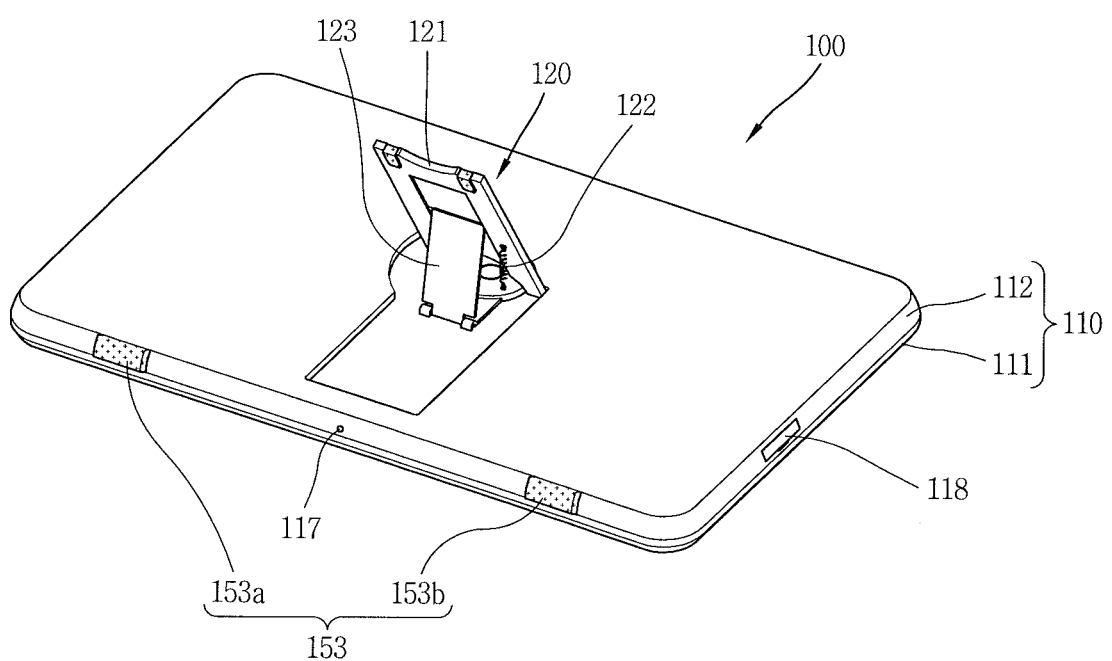
FIG. 3 is a perspective view illustrating an exemplary support unit that is rotated to support a body of the exemplary portable electronic apparatus of FIG. 2.
Figure 4:
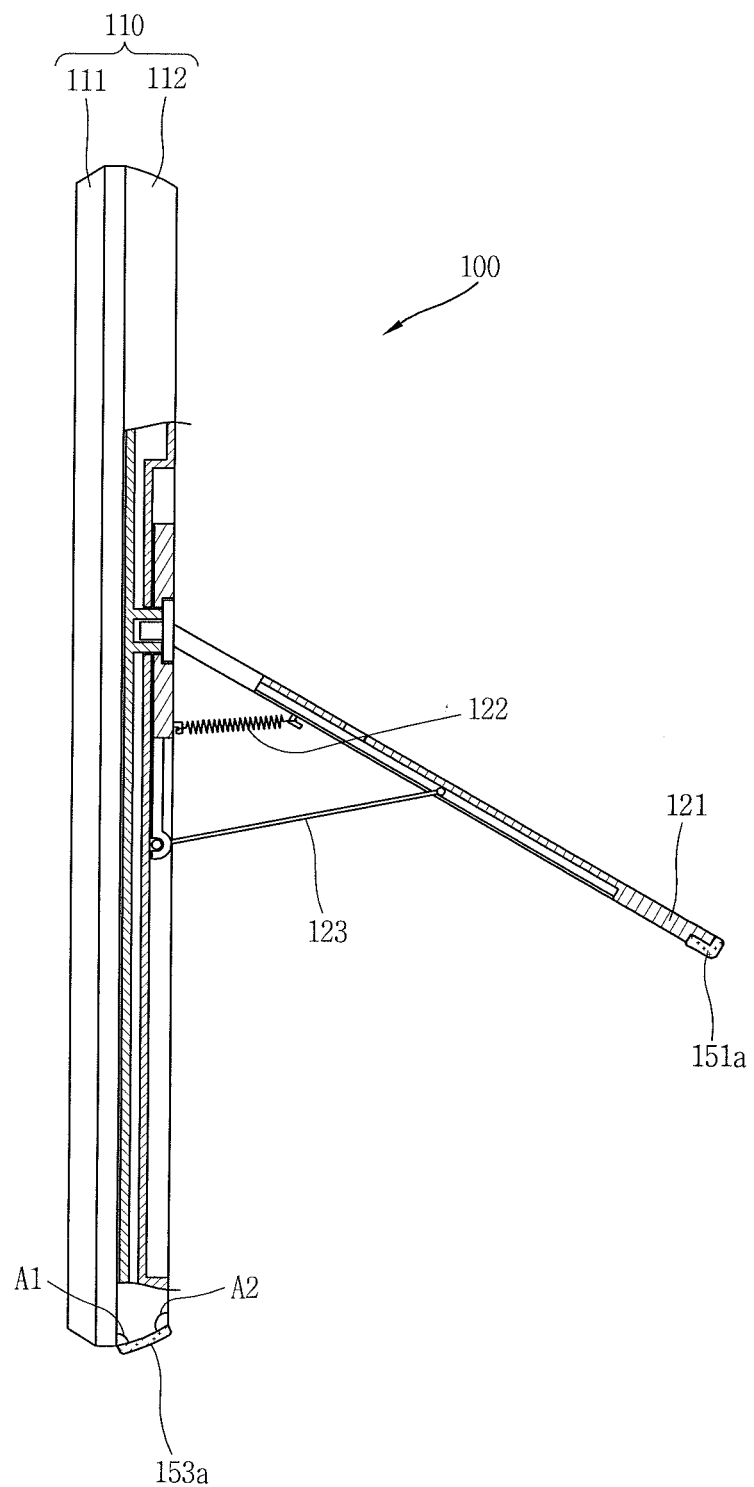
FIG. 4 is a side view illustrating the exemplary portable electronic apparatus of FIG. 3.
Figure 5A:
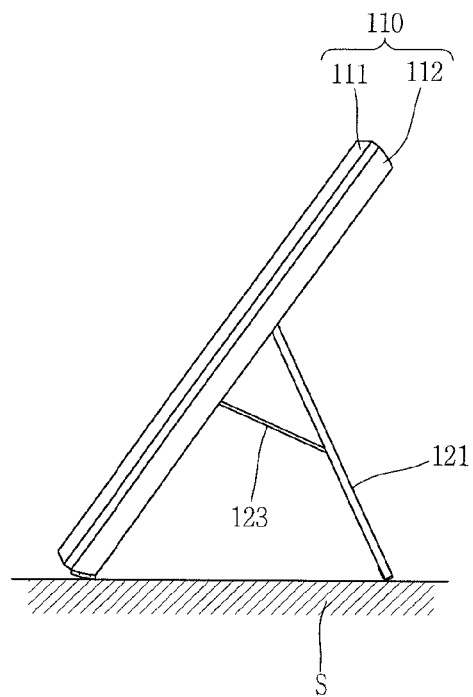
FIGS. 5A and 5B are conceptual views illustrating the operation of an exemplary support module in the portable electronic apparatus of FIG. 3.
Figure 5B:
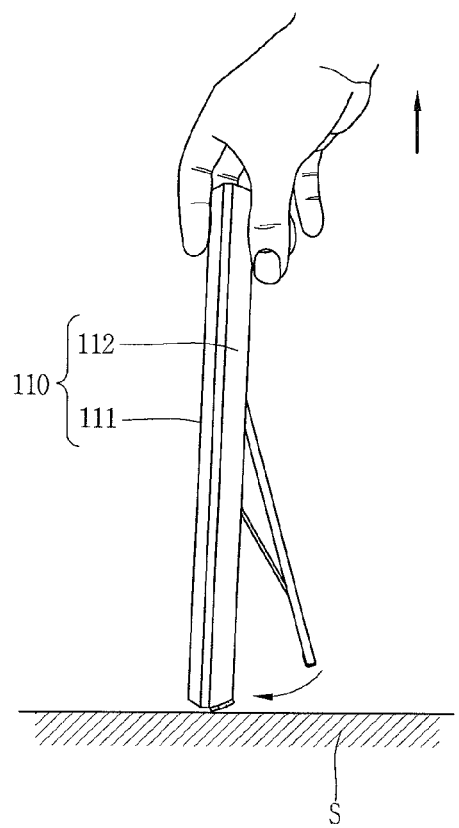

FIG. 3 is a perspective view illustrating an exemplary support unit 121 that is rotated to support a body of the exemplary portable electronic apparatus 100 of FIG. 2. FIG. 4 is a side view illustrating the exemplary portable electronic apparatus of FIG. 3. FIGS. 5A and 5B are conceptual views illustrating the operation of an exemplary support module 120 in the portable electronic apparatus of FIG. 3.

As shown in the drawings, a support module 120 for supporting the body is mounted on a portable electronic apparatus body such that the body is disposed in an inclined direction relative to a surface S (refer to FIG. 5A). Here, the surface S denotes a portion where a portable electronic apparatus may be placed, such as a desk, a table, a sitting person's thighs, or the like.

The support module 120 may include a support unit 121, an elastic unit 122 (refer to FIG. 4), and a guide unit 123.

The support unit 121 is mounted on a rear surface of an electronic apparatus body 110, and configured to be relatively rotated to the body 110 between a first configuration (refer to FIG. 2) disposed to cover a rear surface of the body 110 and a second configuration (refer to FIG. 3) in which one end thereof is apart from the rear surface of the body 110. A rear surface of the electronic apparatus body 110 may be an outer surface of a rear case 112, and the support unit 121 may be formed in a bar shape.

The elastic unit 122 is mounted on the electronic apparatus body 110, and formed to apply elastic force to the support unit 121 in the direction of rotating the support unit 121 to the first configuration. More specifically, if the support unit 121 is rotated from the first configuration to the second configuration, then the elastic unit 122 is transformed to apply elastic force in the direction of restoring the support unit 121 to the first configuration. For such an example, the elastic unit 122 may be a coil spring such that both ends thereof are connected to a side of the support unit 121 and a rear surface side of the electronic apparatus body 110, respectively.

As shown in FIG. 5A, the support unit 121 supports a rear surface of the electronic apparatus body in a state that a lateral surface of the electronic apparatus body 110 and an end of the support unit 121 are brought into contact with a surface S, respectively. At this time, a lateral surface of the electronic apparatus body 110 and an end of the support unit 121 are subject to a force being applied in opposing directions such that the they are placed apart from each other. If the force is balanced with the sum of an elastic force of the elastic unit 122 and a friction force to the surface S, then the electronic apparatus 100 may be placed at a tilt with respect to the surface S (hereinafter, referred to as "placement state").

As shown in FIG. 5B, if one end of the support unit 121 is released from the contact with the surface S in the placement state, then the support unit 121 is restored to the first configuration by the elastic force of the elastic unit 122. As a result, the user can carry a portable electronic apparatus in a form that the volume occupied by the support unit 121 or support module 120 is reduced.

As shown in FIGS. 3, 4, 5A, and 5B, the guide unit 123 is disposed between the electronic apparatus body 110 and the support unit 121. The guide unit 123 is formed to guide the rotation of the support unit 121. More specifically, one end of the guide unit 123 is rotatably mounted on a rear surface of the electronic apparatus body 110, and the other end thereof is slide-ably combined with the support unit 121.

Figure 6:
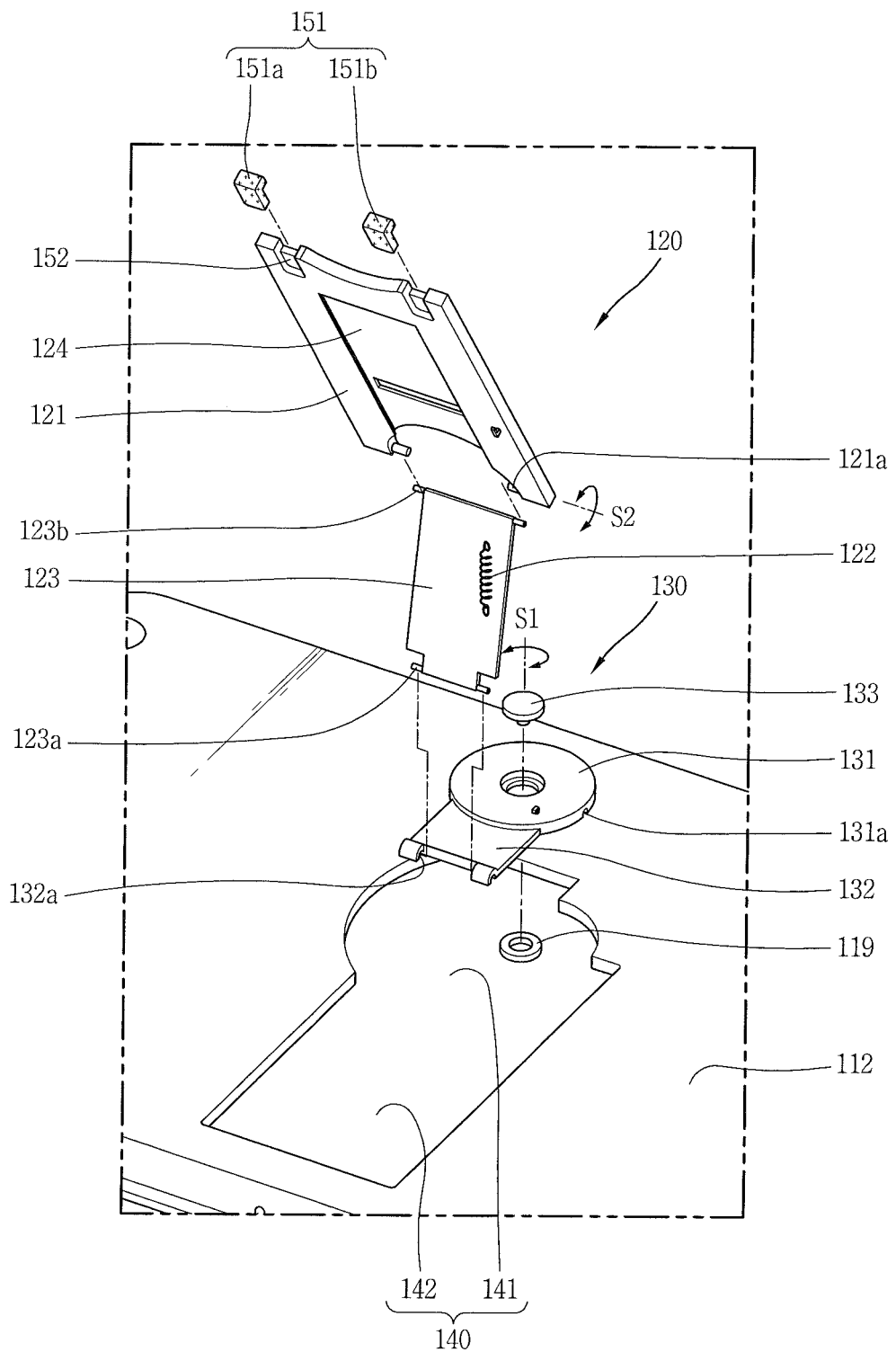
FIG. 6 is an exploded perspective view illustrating an exemplary support module of FIG. 3.
Figure 7:
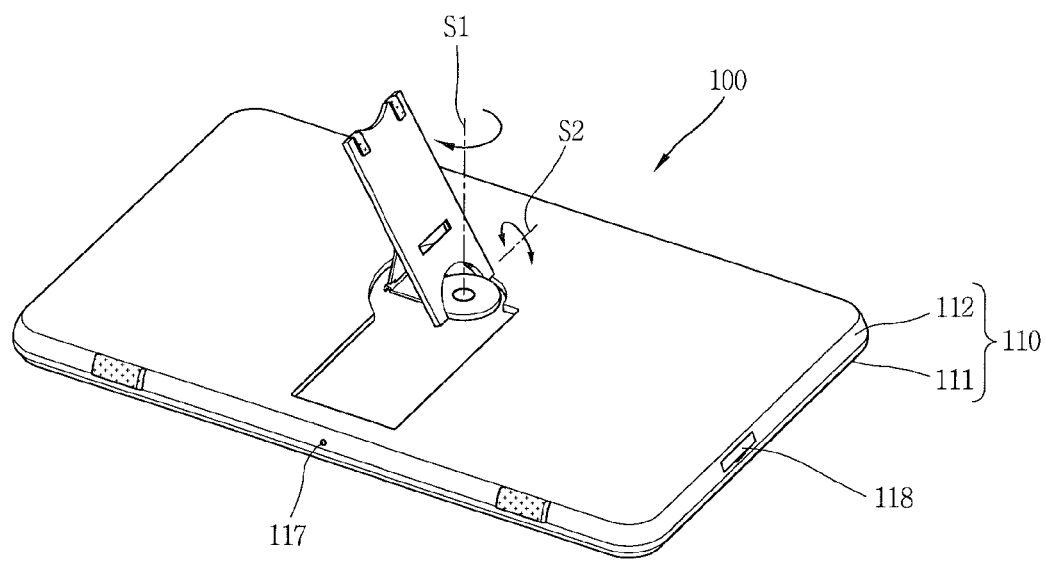
FIG. 7 is a conceptual view illustrating the operation of an exemplary rotation unit of FIG. 3.

FIG. 6 is an exploded perspective view illustrating an exemplary support module 120 of FIG. 3. FIG. 7 is a conceptual view illustrating the operation of an exemplary rotation unit of FIG. 3. The support module 120 will be described in more detail.

As illustrated in the drawings, one end of the support unit 121 forms a free end, and the other end thereof is rotatably mounted on the body 110. More specifically, the support unit 121 is mounted on the rotation unit 130. The rotation unit 130 is mounted on the electronic apparatus body 110 to be rotated around a first axis (S1) perpendicular to a rear surface of the body 110. The rotation unit 130 may include a circular portion 131 and an extension portion 132.

The circular portion 131 is formed in a circular shape around the first axis, and rotatably engaged with a pivot engagement portion 119 of the electronic apparatus body 110 using a pivot unit 133. An insertion hole 131a is formed on an outer circumference of the circular portion 131 in a radial direction, and a protrusion 121a is provided at an end portion of the support unit 121 to be inserted into the insertion hole 131a. In other words, the protrusion 121a is fitted in the insertion hole 131a, and the support unit 121 is rotated around the protrusion 121a. In other words, the support unit 121 is rotatably combined with the rotation unit 130 around a second axis (S2, central axis of the protrusion) perpendicular to the first axis.

As shown in FIG. 7, the support unit 121 is formed to be rotated on a plane perpendicular to a rotation plane of the rotation unit 130, and the rotation unit 130 may be configured to be rotated within a specific rotation range. For example, the rotation range may be located between a configuration in which one end of the support unit 121 is in parallel with a lateral surface of the electronic apparatus body 110 and a configuration in which the one end of the support unit 121 is in parallel with a lateral surface perpendicular to the lateral surface. Accordingly, the portable electronic apparatus may be placed in a vertical or horizontal direction.

With reference to FIG. 6, an accommodation portion 140 may be formed at a rear surface of the electronic apparatus body 110. The accommodation portion 140 is recessed at a rear surface of the body 110 to accommodate the support unit 121 on the rear surface of the body 110. The accommodation portion 140 is configured to accommodate the rotation unit 130 and support unit 121 together, and the rotation unit 130 is rotatably mounted on the accommodation portion 140. More specifically, the accommodation portion 140 may include a circular region 141 corresponding to the circular portion 131 of the rotation unit 130 and an extension region 142 extended from the circular region to accommodate the extension portion 132 of the rotation unit 130 and the support unit 121. Accordingly, the support module 120 may not protrude from a rear surface of the electronic apparatus body 110, thereby facilitating the portability of a portable electronic apparatus.

The extension portion 132 extends from the circular portion 131 to a direction in parallel to a rear surface of the body 110, and the guide unit 123 is rotatably combined with the extension portion 132.

The guide unit 123 is formed in a bar shape, and hinge axes 123a and 123b may be formed at both ends thereof. Either of the hinge axes 123a or 123b may be hinge-combined with the extension portion 132, and a hinge hole 132a may be formed at the extension portion 132.

A guide groove 124 extending from one end of the support unit 121 to the other end thereof is formed on the support unit, and an end portion of the guide unit is configured to slide along the guide groove 124. More specifically, a hinge axis 123b is formed at an end portion opposite to the end of the guide unit 123 combined with the extension portion 132, and both lateral surfaces of the vertical supporting stand 124 are formed to accommodate the hinge axis 123b.

An end of the elastic unit 122 is connected to the rotation unit 130, and the other end thereof is combined with the support unit 121 to apply an elastic force to the support unit 121. However, the present invention is not limited to this. For example, the elastic unit 122 may be a torsion spring disposed to be elastically transformed in the direction of being wound by the rotation of the support unit.

A first friction reinforcement portion 151 is formed at an end of the support unit 121. If the end of the support unit 121 is brought into contact with the surface S (refer to FIG. 5A), then the first friction reinforcement portion 151 is configured to reinforce the friction force of a portion in contact with the surface S. For example, the first friction reinforcement portion 151 may include first friction units 151a and 151b formed with a material having a frictional coefficient greater than that of the support unit 121. For example, first friction units 151a and 151b may be formed with a material such as rubber, and the like. A mounting groove 152 on which first mounting units 151a and 151b are formed at an end of the support unit 121, and the first mounting units 151a and 151b are fitted in the mounting groove 152. However, the present invention is not limited to this. For example, the first friction reinforcement portion 151 may be formed with various shapes such that the surface thereof is roughened or the protrusion thereof is provided, and so on.

A second friction reinforcement portion 153, together with the first friction reinforcement portion 151, may be provided to reinforce the friction force of a portion in contact with the floor. The second friction reinforcement portion 153 is illustrated in FIGS. 2 through 4, and the second friction reinforcement portion 153 is formed at a lateral surface of the body 110 to reinforce the friction force of a portion where a lateral surface of the electronic apparatus body 110 is brought into contact with the floor. For example, the second friction reinforcement portion 153 is mounted at a lateral surface of the body 110, and may include second friction units 153a and 153b formed with a material having a frictional coefficient greater than that of the cases 111, 112 of the body 110. The second friction units 153a and 153b may be provided with a plural number, and disposed at symmetric positions on the basis of the center of the body.

At least part of the second friction units 153a and 153b may be formed to protrude from a lateral surface thereof. As shown in FIG. 4, a lateral surface of the body 110 mounted with the second friction units 153a and 153b is inclined to make an obtuse angle (A2) with a rear surface of the body 110. Also, the lateral surface of the body 110 may form an acute angle (A1) with respect to a cross-section of the body electronic apparatus body 110. Accordingly, when an electronic apparatus is placed to be inclined relative to the surface S (refer to FIG. 5A), an area where the second friction units 153a and 153b are brought into contact with the surface S may be increased.

Figure 8:
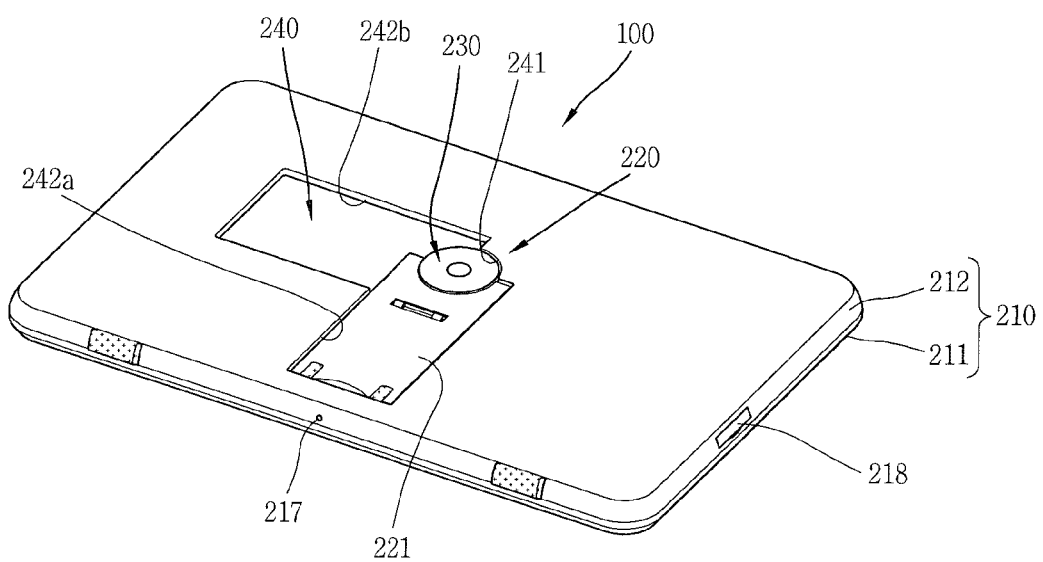
FIG. 8 is a conceptual view illustrating a modified example of an exemplary accommodation portion of FIG. 3.

FIG. 8 is a conceptual view illustrating a modified example of an exemplary accommodation portion of FIG. 3.

An accommodation portion 240 may include a circular region 241 corresponding to the circular portion 231 of the rotation unit 230 and a plurality of extension regions 242a and 242b extended from the circular region 241 to both directions perpendicular to each other.

The extension regions 242a and 242b are formed to accommodate an extension portion 232 of the rotation unit 230 and a support unit 221, and through this, the slide module 220 may be accommodated in a rear surface of the electronic apparatus body 210 in any one of a plurality of configurations. In other words, if the floor is released from the contact with the support unit 221, then the slide module 220 is automatically accommodated in the accommodation portion 240, regardless of the position of a portable electronic apparatus being placed in a horizontal or vertical direction.

Figure 9:
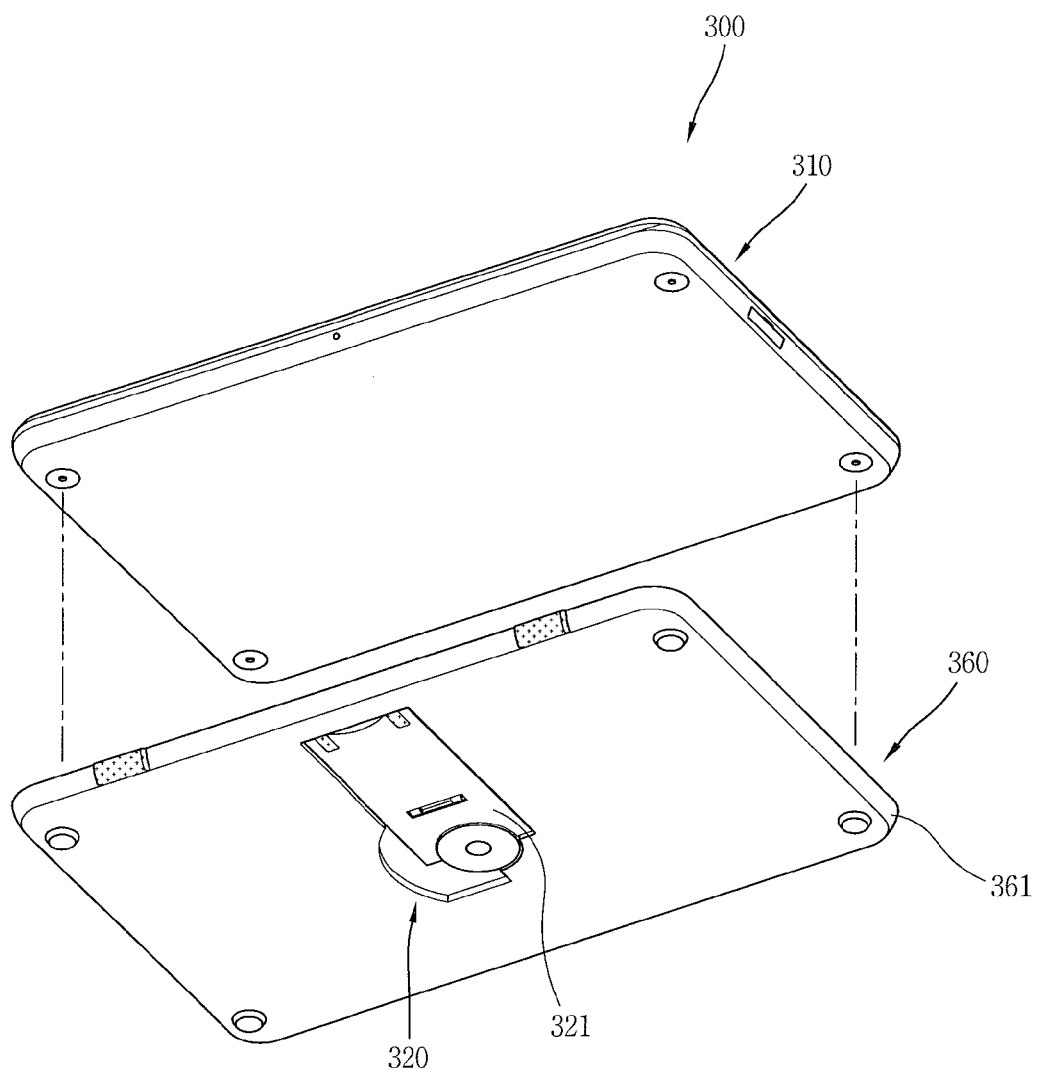
FIG. 9 is a perspective view illustrating another example of a portable electronic apparatus according to another exemplary embodiment of the present invention.

FIG. 9 is a perspective view illustrating another example of a portable electronic apparatus according to another exemplary embodiment of the present invention.

As shown in FIG. 9, an expansion module 360 may be mounted at a rear surface of the portable electronic apparatus 300. Electronic elements are incorporated in an expansion body 361 of the expansion module 360, and configured to exchange data or power with a body 310 of the portable electronic apparatus 300. For example, the expansion module 360 may be an external battery, an external wireless communication module, a monitor, a keyboard, and the like.

A body 310 of the electronic apparatus 300 is mounted on a front surface of the expansion module 360, and a slide module 320 is disposed at a rear surface thereof. The slide module 320 supports the expansion body 361 such that the expansion body 361 is disposed in an inclined direction relative to a surface.

The support unit 321 is mounted on a rear surface of the expansion body 361, and configured to be relatively rotated to the expansion body 361 between a first configuration disposed to cover a rear surface of the expansion body 361 and a second configuration in which one end thereof is apart from the rear surface of the expansion body 361. An elastic unit (not shown) is mounted on the expansion body 361, and formed to apply elastic force to the support unit 321 in the direction of rotating the support unit 321 to the first configuration. A guide unit (not shown) is disposed between the expansion body 361 and the support unit 321 to guide the rotation of the support unit 321. With the foregoing configuration, a portable electronic apparatus may be more easily placed even in the state of being combined with an expansion module thereof.

In a portable electronic apparatus having the foregoing configuration associated with the present invention, a main body thereof is placed by using friction force and elastic force, thereby forming a support or placement mechanism in which the main body can be freely fixed with respect to the floor within a specific angle range. In addition, a portable electronic apparatus in which the support unit is automatically accommodated therein when the placement is released in a manner that an elastic unit thereof applies elastic force in the direction of restoring the support unit may be implemented.

It will be apparent to those skilled in the art that various modifications and variations can be made in the portable electronic apparatus of the present invention without departing from the spirit or scope of the invention. Thus, it is intended that the present invention cover the modifications and variations of this invention provided they come within the scope of the appended claims and their equivalents.

What is claimed is:

1. A portable electronic apparatus comprising:
   a main body having a front portion and a rear portion;
   a display unit disposed on the front portion; and
   a support module disposed on the rear portion, the support module operable to support the main body at an incline relative to a surface, the support module including:
   a support unit, a free end of the support unit being disposed on the rear portion in a first configuration and the free end of the support unit being disposed apart from the rear portion in a second configuration;
   a guide unit, the guide unit being disposed between the main body and the support unit to guide the rotation of the support unit; and
   an elastic unit, the elastic unit being connected to the support unit and the rear portion so as to apply an elastic force to the support unit in the direction of rotation of the support unit,
   wherein the guide unit is configured such that a first end of the guide unit is rotatably connected to the rear portion of the main body and a second end of the guide unit is slide-ably connected to the support unit.

2. The portable electronic apparatus according to claim 1, wherein the support unit is disposed in the first configuration by the elastic force of the elastic unit when the free end of the support unit is not in contact with the surface.

3. The portable electronic apparatus according to claim 1, wherein the free end of the support unit is operable to contact the surface and the other end is rotatably connected to the main body.

4. The portable electronic apparatus according to claim 3, further comprising a first friction reinforcement portion formed at the free end of the support unit, the first friction reinforcement portion configured to increase the friction force between the free end of the support unit and the surface.

5. The portable electronic apparatus according to claim 4, wherein the first friction reinforcement portion includes a first friction unit formed with a material having a frictional coefficient greater than that of the support unit.

6. The portable electronic apparatus according to claim 1, wherein the support unit includes a guide groove extending from one end of the support unit to the other end of the support unit is formed on the support unit, the second end of the guide unit configured to slide along the guide groove.

7. The portable electronic apparatus according to claim 1, further comprising a second friction reinforcement portion formed on a lateral surface of the main body to reinforce the friction force of a portion where the lateral surface of the main body is brought into contact with the surface.

8. The portable electronic apparatus according to claim 7, wherein the second friction reinforcement includes a second friction unit formed with a material having a frictional coefficient greater than that of a case of the main body.

9. The portable electronic apparatus according to claim 8, wherein at least part of the second friction unit protrudes from the case of the main body.

10. The portable electronic apparatus according to claim 8, wherein the lateral surface of the main body having the second friction unit is inclined to make an obtuse angle with a rear surface of the main body.

11. The portable electronic apparatus according to claim 1, wherein the support module is rotatably connected to the main body around a first axis perpendicular to the rear portion of the main body, the support module further including a rotation unit, the support unit being rotatably connected to a rotation unit around a second axis perpendicular to the first axis.

12. The portable electronic apparatus according to claim 11, wherein the rotation unit comprises:
a circular portion formed in a circular shape around the first axis; and
an extension portion extended from the circular portion in a direction in parallel with a lateral surface of the main body, with which the guide unit is rotatably combined.

13. The portable electronic apparatus according to claim 1, wherein the rear portion includes a recessed accommodation portion, the recessed accommodation portion operable to store the support module.

14. The portable electronic apparatus according to claim 13, wherein a rotation unit connected to the support unit is rotatably mounted in the accommodation portion, the support unit operable to rotate on a plane perpendicular to a rotation plane of the rotation unit.

15. The portable electronic apparatus according to claim 14, wherein the rotation unit is provided with a rotation range between a configuration in which one end of the support unit is in parallel with a lateral surface of the main body and a configuration in which the one end of the support unit is in parallel with a lateral surface perpendicular to the lateral surface.

16. The portable electronic apparatus according to 1, wherein the rear portion further includes an expansion module configured to exchange data or power with the main body, the support module disposed on a rear surface of the expansion module.

17. An expansion module for a portable electronic apparatus, the module comprising:
an expansion body connected to a rear portion of the portable electronic apparatus, the expansion body operable to exchange data or power with the portable electronic apparatus; and
a support module disposed on a rear surface of the expansion body, the support module operable to support the expansion body and the portable electronic apparatus at an incline relative to a surface, the support module including:
a support unit, a free end of the support unit being disposed on the rear portion in a first configuration and the free end of the support unit being disposed apart from the rear portion in a second configuration;
a guide unit, the guide unit being disposed between the main body and the support unit to guide the rotation of the support unit; and
an elastic unit, the elastic unit being connected to the support unit and the rear portion so as to apply an elastic force to the support unit in the direction of rotation of the support unit,
wherein the guide unit is configured such that a first end of the guide unit is rotatably connected to the rear portion of the main body and a second end of the guide unit is slide-ably connected to the support unit.

18. The expansion module for a portable electronic apparatus according to claim 17, wherein the support unit is disposed in the first configuration by the elastic force of the elastic unit when the free end of the support unit is not in contact with the surface.

19. A portable electronic apparatus comprising:
a main body having a front portion and a rear portion;
a display unit disposed on the front portion; and
a support module disposed on the rear portion, the support module operable to support the main body at an incline relative to a surface, the support module including:
a support unit, a free end of the support unit being disposed on the rear portion in a first configuration and the free end of the support unit being disposed apart from the rear portion in a second configuration;
an elastic unit, the elastic unit being connected to the support unit and the rear portion so as to apply an elastic force to the support unit in the direction of rotation of the support unit,
wherein the support unit is configured to be restored to the first configuration by the elastic force of the elastic unit if one end of the support unit is released from the contact with the surface in a second configuration; and
a guide unit, the guide unit being disposed between the main body and the support unit to guide the rotation of the support unit,
wherein the guide unit is configured such that a first end of the guide unit is rotatably connected to the rear portion of the main body and a second end of the guide unit is slide-ably connected to the support unit.

* * * * *